United States Patent
Barthelemy et al.

(12)

(10) Patent No.: US 6,210,602 B1
(45) Date of Patent: *Apr. 3, 2001

(54) COMPOSITIONS INCLUDING 1,1,1,3,3-PENTAFLUOROBUTANE AND PROCESS FOR REMOVING WATER FROM A SOLID SURFACE

(75) Inventors: Pierre Barthelemy, Pietrebais; Mireille Paulus, Brussels, both of (BE)

(73) Assignee: Solvay S.A., Brussels (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/619,669

(22) PCT Filed: Sep. 20, 1994

(86) PCT No.: PCT/EP94/03145

§ 371 Date: Mar. 29, 1996

§ 102(e) Date: Mar. 29, 1996

(87) PCT Pub. No.: WO95/09228

PCT Pub. Date: Apr. 6, 1995

(30) Foreign Application Priority Data

Sep. 29, 1993 (BE) .................................................. 9301018

(51) Int. Cl.$^7$ ................................. C09K 3/00; C09K 3/18
(52) U.S. Cl. ......................... 252/194; 510/175; 510/412; 252/364; 134/12; 134/42
(58) Field of Search .................... 510/412, 175; 252/194, 364; 134/12, 42

(56) References Cited

U.S. PATENT DOCUMENTS

| | | | |
|---|---|---|---|
| 4,594,177 | 6/1986 | Lantz et al. ............................ | 252/194 |
| 5,102,469 | * 4/1992 | Buchwald et al. ................. | 134/22.14 |
| 5,268,121 | 12/1993 | Michaud ............................... | 510/177 |
| 5,478,492 | * 12/1995 | Barthelemy et al. .................. | 134/40 |

FOREIGN PATENT DOCUMENTS

| | | |
|---|---|---|
| 0512885A1 | 11/1992 | (EP) . |
| 5-168805 | * 7/1993 | (JP) . |
| 5-171185 | * 7/1993 | (JP) . |
| 5-171190 | * 7/1993 | (JP) . |
| 5-302098 | * 11/1993 | (JP) . |

OTHER PUBLICATIONS

Ralson et al. J. Organic Chemistry 1944, 9, p. 102–12 No Month Available.
Hunter, Chemical Abstracts, 1942, 4475 No Month Available.
Derwent Abstract AN 93–247650 and English Translation of JP–A–05/168805 (Asahi Glass), 7/1993.
Derwent Abstract AN 93–253064 of JP–A–05/171190 (Asahi Glass), 7/1993.
Derwent Abstract AN 93–247656 of JP–A–05/168811 (Asahi Glass), 7/1993.

* cited by examiner

Primary Examiner—Yogendra Gupta
Assistant Examiner—Gregory E. Webb
(74) Attorney, Agent, or Firm—Venable; Marina V. Schneller

(57) ABSTRACT

Compositions including 1,1,1,3,3-pentafluorobutane and at least one surface-active agent chosen from hydrophobic organic surface-active agents of the amine, carboxylic acid diester and phosphoric acid ester types, which can be employed for removing water from a solid surface.

12 Claims, No Drawings

COMPOSITIONS INCLUDING 1,1,1,3,3-PENTAFLUOROBUTANE AND PROCESS FOR REMOVING WATER FROM A SOLID SURFACE

FIELD OF THE INVENTION

The present invention relates to compositions based on 1,1,1,3,3-pentafluorobutane (HFC-365mfc) and to a process for removing water from a solid surface by means of these compositions.

TECHNOLOGY REVIEW

In the fields of the electrical, electronics, optical and mechanical industries in particular it may happen that in the course of the production of high-precision articles, some components of these articles come, intentionally or not, into contact with water or moisture. These are, for example, components of liquid crystal display devices, of electronic components, of timepiece components and of optical components such as lenses. The water may adhere to the surface of these articles and subsequently cause some detrimental effects during subsequent stages of their application or may deteriorate the quality of the articles into which these components are finally incorporated.

It is consequently indispensible, in the case of many precision components, that they should be completely freed from any water adhering to their surface, before any subsequent application. This operation of removing water at the surface can be carried out especially by displacing water by means of a water-immiscible, dense organic liquid optionally containing a surface-active agent; in this connection, compositions based on 1,1,2-trichloro-1,2,2-trifluoroethane (CFC-113) and surface-active agents have been described in U.S. Pat. No. 4,594,177. However, CFC-113 forms part of fully halogenated chlorofluorocarbons which are currently suspected of attacking or damaging stratospheric ozone.

European Patent Application EP-A-0512885 describes an azeotropic composition based on 1,1,1,3,3-pentafluorobutane and methanol for cleaning, degreasing and drying solid surfaces. This composition avoids the abovementioned disadvantage of the CFC-113-based compositions. However, the use of this known composition for displacing water from solid surfaces presents problems linked with the solubility of methanol in water; in fact, during successive uses the compositions become depleted in methanol and thus lose their properties. In addition, methanol has the disadvantage of being toxic and flammable.

Japanese Patent Application JP-A-05/168805 describes a composition for removing water adhering to a surface, including 1,1,1,3,3-pentafluorobutane and a surfactant consisting of a salt of an organic acid and of an organic base. These compositions exhibit poor dryability.

SUMMARY OF THE INVENTION

The subject of the invention is compositions including 1,1,1,3,3-pentafluorobutane, exhibiting good ability to remove water from solid surfaces, without exhibiting the abovementioned disadvantages of the known compositions.

DETAILED DESCRIPTION OF THE INVENTION

The invention consequently relates to compositions including 1,1,1,3,3-pentafluorobutane and at least one surface-active agent chosen from hydrophobic organic surface-active agents of the amine type, of the carboxylic acid diester type and of the phosphoric acid ester type. Surface-active agents of the amine type are intended to denote surface-active agents including at least one amine group. Surface-active agents of the carboxylic acid diester type are intended to denote surface-active agents including at least two carboxylic acid ester groups. Surface-active agents of the phosphoric acid ester type are intended to denote surface-active agents including at least one phosphoric acid ester group.

In the case where the surface-active agent of the compositions according to the invention is of the amine type it may be a primary, secondary or tertiary amine, for example a mono-, di- or trialkylamine in which the alkyl group may be linear or branched. Linear or branched, primary alkylamines containing at least 6, preferably at least 8 carbon atoms are preferred. 2-Ethylhexylamine, octylamine and nonylamine, as well as their mixtures, are particularly preferred.

In the case where the surface-active agent is of the carboxylic acid diester type, the latter is advantageously an aromatic diester. Diesters of phthalic acid are preferred. Dioctyl phthalate and di(2-ethylhexyl) phthalate, and their mixtures, are particularly preferred.

In the case of a surface-active agent of the phosphoric acid ester type, the latter may advantageously be a triester of phosphoric acid. Among the triesters of phosphoric acid, alkyl, aryl and alkyl aryl phosphates are recommended. Trialkyl phosphates are particularly advantageous and tributyl phosphate is very particularly preferred.

In an advantageous embodiment of the compositions according to the invention, the composition includes (a) a surface-active agent of the amine type and (b) a surface-active agent of the carboxylic acid diester type or a surface-active agent of the phosphoric acid ester type. The composition preferably includes a surface-active agent of the amine type and a surface-active agent of the phosphoric acid ester type. In a particularly preferred manner the surface-active agent of the amine type is octylamine and/or nonylamine and the surface-active agent of the phosphoric acid ester type is tributyl phosphate. In this embodiment of the invention the molar ratio (a):(b) is preferably from 0.3:1 to 1.5:1.

The compositions of the invention preferably include from 5 to 99.995% by weight of 1,1,1,3,3-pentafluorobutane and from 0.005% to 10% by weight of the surface-active agent.

In an especially advantageous embodiment of the compositions according to the invention, the latter contain from 90 to 99.995% by weight of 1,1,1,3,3-pentafluorobutane.

In addition to the compounds described above, the compositions according to the invention may contain other additives making it possible to improve the performance of the compositions when they are used, such as stabilizers, deemulsifiers and/or antifoams.

In addition to 1,1,1,3,3-pentafluorobutane and to the surface-active agent, the compositions according to the invention may contain other hydrocarbons, especially halogenated hydrocarbons. The compositions according to the invention may especially contain 1,1-dichloro-1-fluoroethane (HCFC-141b). Compositions in accordance with the invention are those including from 70 to 95% by weight of 1,1-dichloro-1-fluoroethane and from 3 to 25% by weight of 1,1,1,3,3-pentafluorobutane, especially those including the azeotrope of 1,1-dichloro-1-fluoroethane and of 1,1,1,3,3-pentafluorobutane.

Compositions consisting essentially of 1,1,1,3,3-pentafluorobutane and of at least one surface-active agent are, nevertheless, preferred.

The compositions according to the invention are liquid compositions which are particularly well suited for displacing water from solid surfaces. The compositions according to the invention satisfy the strictest criteria applicable to the compositions employed for removing water from solid surfaces by displacing it. Thus, they are particularly effective for displacing more than 75%, generally at least 99%, or even all of the water present on a solid surface. The displacement of the water is very fast. The compositions according to the invention do not form any emulsion with the water but, on the contrary, promote the formation of two phases, a lower phase consisting essentially of the composition according to the invention, in which a little water may possibly be dissolved, and an upper phase consisting essentially of the displaced water. This permits a simple subsequent separation between the displaced water and the composition. Moreover, the compositions according to the invention lend themselves to a large number of successive uses without their constitution undergoing any appreciable alteration. In fact, the surface-active agent is not significantly extracted from the compositions by the water which is displaced and subsequently separated from the latter.

The compositions according to the invention are suitable for drying a wide variety of different materials. They are suitable especially for drying articles made of metal, glass, ceramics, precious stones or plastics.

The invention consequently also relates to a process for removing water from a solid surface, which is characterized in that the surface is treated with a composition according to the invention.

The process according to the invention applies equally well to moist surfaces, to surfaces on which water droplets are present and to surfaces which are completely covered with a film of water adhering to the surface.

To treat the solid surface with the composition according to the invention it is possible, for example, to subject it to spraying, to sprinkling or to swabbing with the composition or to immersion in a bath of the composition. When immersion techniques are employed the composition may be agitated by any appropriate means and the action of the composition may be reinforced, for example by the application of ultrasound.

The process according to the invention may be used at any temperature between the freezing point of water and the boiling point of the composition. The treatment period is not critical. For practical reasons it is generally recommended to place the surface to be treated in contact with the composition for a period of approximately one minute, although shorter or longer treatment periods may be employed, depending on the characteristics of the surface to be treated. In general the treatment period is at least 5 seconds, in most cases at least 30 seconds. The treatment period usually does not exceed 10 minutes. In most cases it does not exceed 5 minutes.

At the end of the treatment with the composition the solid surface is in most cases rinsed with a non-aqueous solvent used in liquid or gaseous form. 1,1,1,3,3-Pentafluorobutane may be employed for this purpose.

EXAMPLES

The nonlimiting examples which follow are given by way of illustration. Example 1R is given by way of comparison, Examples 2 and 3 are carried out according to the invention.

Example 1R

A piece of polyvinylidene fluoride (PVDF) which is of a parallelepipedal shape (30×20×10 mm) and pierced with 24 holes 3 mm in diameter is immersed in water, so as to fill its holes. The piece is then immersed in a bath consisting of boiling 1,1,1,3,3-pentafluorobutane. After 10, 20, 30 and 60 seconds of immersion, the piece is taken out of the bath and the number of holes free from water is determined by visual inspection. The results of these observations are collated in Table I, in which the proportion of holes free from water is expressed as a percentage of the total number of holes.

1,1,1,3,3-Pentafluorobutane is found to be completely ineffective for removing water; even after one minute's immersion, no holes can be considered to be dry.

Example 2

The procedure of Example 1R was repeated with a bath in accordance with the invention, consisting of 99.5 weight % of 1,1,1,3,3-pentafluorobutane, 0.19 weight % of octylamine and 0.31 weight % of tributyl phosphate. The percentages of holes free from water are given in Table I.

After one minute's immersion 79% of the holes may be considered as being free from water.

Example 3

The procedure of Example 1R was repeated with a bath in accordance with the invention, consisting of 99.96 weight % of 1,1,1,3,3-pentafluorobutane and 0.04 weight % of dioctyl phthalate. The percentages of holes free from water are given in Table I.

After one minute's immersion, all of the holes may be considered as being free from water.

TABLE I

|  | % of holes free from water after | | | |
|---|---|---|---|---|
|  | 10 s | 20 s | 30 s | 60 s |
| Example 1R | 0 | 0 | 0 | 0 |
| Example 2 | 0 | 63 | 75 | 79 |
| Example 3 | 29 | 63 | 79 | 100 |

What is claimed is:

1. A method for removing water from a solid surface comprising:

treating a solid surface on which water is present with a composition comprising from 5 to 99.995 weight % of 1,1,1,3,3-pentafluorobutane and from 0.005 to 10 weight % of a hydrophobic organic surface-active agent consisting of one or more compounds selected from the group consisting of linear or branched primary amines of six (6) or more carbons, secondary amines, tertiary amines, carboxylic diesters and phosphoric acid esters, and at least partially removing said water from said surface.

2. The method according to claim 1, wherein said composition comprises from 90 to 99.995% by weight of 1,1,1,3,3-pentafluorobutane.

3. The method of claim 1, wherein the surface-active agent is an amine selected from the group consisting of primary alkylamines containing at least 8 carbon atoms.

4. The method according to claim 3, wherein the alkylamine is selected from the group consisting of octylamine, 2-ethylhexylamine, nonylamine and mixtures thereof.

5. The method according to claim 1, wherein the carboxylic acid diester is a diester of phthalic acid.

6. The method according to claim 5, wherein the diester of phthalic acid is selected from the group consisting of dioctyl phthalate, di(2-ethylhexyl)phthalate and mixtures thereof.

7. The method according to claim 1, wherein the organic surface-active agent is a phosphoric acid ester selected from the group consisting of trialkylphosphates.

8. The method according to claim 7, wherein the trialkyl phosphate is tributyl phosphate.

9. The method according to claim 1, wherein the surface-active agent consists of (a) a surface-active agent which is an amine and (b) a surface-active agent which is a carboxylic acid diester or a surface-active agent which is a phosphoric acid ester.

10. The method according to claim 9, wherein the molar ratio (a):(b) is from 0.3:1 to 1.5:1.

11. The method according to claim 9, wherein the surface-active agent which is an amine is octylamine and/or nonylamine and the surface-active agent which is a phosphoric acid ester is tributyl phosphate.

12. The method according to claim 1, wherein the composition consists essentially of from 5 to 99.995 weight % of 1,1,1,3,3-pentafluorobutane and from 0.005 to 10 weight % of a hydrophobic organic surface-active agent consisting of one or more compounds selected from the group consisting of linear or branched primary amines of six (6) or more carbons, secondary amines, tertiary amines, carboxylic diesters and phosphoric acid esters.

* * * * *